| United States Patent [19] | [11] Patent Number: 4,873,306 |
|---|---|
| Wehowsky et al. | [45] Date of Patent: Oct. 10, 1989 |

[54] URETHANES CONTAINING FLUORINE AND POLYSILOXANE, PROCESS FOR THEIR PREPARATION AND THEIR USE

[75] Inventors: Frank Wehowsky, Burgkirchen; Martin Liebiger, Hofheim am Taunus, both of Fed. Rep. of Germany

[73] Assignee: Hoechst Aktiengesellschaft, Frankfurt am Main, Fed. Rep. of Germany

[21] Appl. No.: 215,202

[22] Filed: Jul. 5, 1988

[30] Foreign Application Priority Data

Jul. 7, 1987 [DE] Fed. Rep. of Germany ....... 3722375

[51] Int. Cl.$^4$ ............................................. C08G 77/04
[52] U.S. Cl. ........................................ 528/28; 528/27; 528/29; 528/33; 528/38; 556/419; 556/420
[58] Field of Search ...................... 528/29, 27, 28, 38, 528/33; 556/419, 420

[56] References Cited

U.S. PATENT DOCUMENTS

| 4,508,916 | 4/1985 | Newell et al. | 556/420 |
|---|---|---|---|
| 4,578,116 | 3/1986 | Rott et al. | 528/29 |
| 4,668,406 | 5/1987 | Chang | 528/70 |
| 4,724,248 | 2/1988 | Dexter et al. | 528/28 |

FOREIGN PATENT DOCUMENTS

| 3530967 | 3/1987 | Fed. Rep. of Germany . |
|---|---|---|
| 3540147 | 5/1987 | Fed. Rep. of Germany . |

*Primary Examiner*—Mevlyn I. Marquis

[57] ABSTRACT

The novel urethanes are composed essentially of fluoroalcohol-isocyanate adducts as the fluoro component and a polysiloxane component, the two components being combined in a structurally specific manner. The novel urethanes are prepared by reacting the fluoroalcohol-isocyanate adducts with the polysiloxane in a molar ratio of 1 to 2:1 at a temperature of 30° to 130° C. The novel urethanes are preferably used for finishing textiles, to which they also impart the property of a soft handle in addition to good hydrophobicity and oleophobicity. They are also suitable for finishing leather, skins and wood.

3 Claims, No Drawings

URETHANES CONTAINING FLUORINE AND POLYSILOXANE, PROCESS FOR THEIR PREPARATION AND THEIR USE

DESCRIPTION

The invention relates to urethanes containing fluorine and polysiloxane. It furthermore relates to a process for the preparation of these urethanes and their use.

Urethanes containing fluorine are described, for example, in the two German Offenlegungsschriften Nos. 3,530,967 and 3,540,147. They are recommended as agents for hydrophobic and oleophobic treatment of textiles and leather.

Urethanes containing fluorine and polysiloxane are described in U.S. Pat. No. 4,508,916. They contain acrylate groups which can be hardened with radiation and are recommended as adhesives for electro-optical systems.

Urethanes containing fluorine and polysiloxane which are outstanding agents for the treatment of textiles have now been found. They impart to the textiles a good hydrophobicity and oleophobicity and in addition to this, surprisingly, also the other particularly desirable property of soft handle. They are moreover also suitable for treatment of leather, skins and wood.

The urethanes according to the invention, containing fluorine and polysiloxane, have the following formula 1

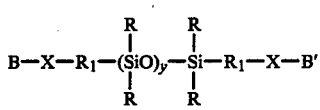   (1)

in which

R denotes $CH_3$ or $C_2H_5$, y denotes a number from 5 to 500, preferably 10 to 300, B denotes a radical of the following formula 2

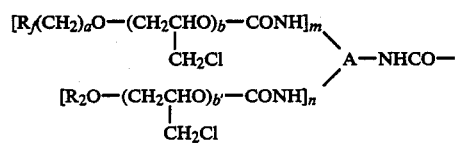   (2)

in which $R_f$ denotes a perfluoroalkyl radical with 4 to 20 carbon atoms, preferably 6 to 16 carbon atoms, an $\omega$-H-perfluoroalkyl radical with 4 to 20 carbon atoms, preferably 6 to 16 carbon atoms, or a radical of the formula $R_f'SO_2NR_3$ or of the formula $R_f'CH_2CH_2SO_2NR_3$, in which $R_f'$ is a perfluoroalkyl radical with 4 to 20 carbon atoms, preferably 6 to 16 carbon atoms, and $R_3=H$ or $C_{1-4}$-alkyl; of these meanings of $R_f$, the perfluoroalkyl radical with 4 to 20 carbon atoms, preferably 6 to 16 carbon atoms, is preferred, $R_2$ denotes an alkyl radical with 4 to 20 carbon atoms, preferably 10 to 18 carbon atoms, a denotes an integer from 1 to 4, preferably 2, b denotes a number from 0 to 10, preferably 1 to 5 or 0, b' denotes a number from 0 to 10, preferably 1 to 5 or 0, m denotes a number from 1 to 2 and n denotes a number from 0 to 1, the sum of m+n being not more than 2, m preferably denoting a number from 1 to 2 and n preferably denoting 0, and A denotes a radical corresponding to one of the following formulae 3 to 11

   (3)

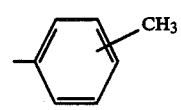   (4)

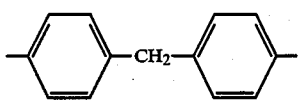   (5)

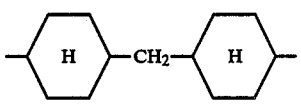   (6)

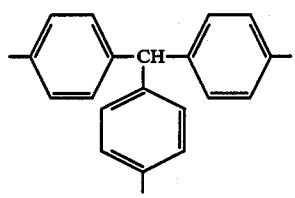   (7)

   (8)

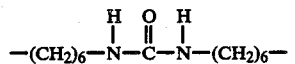   (9)

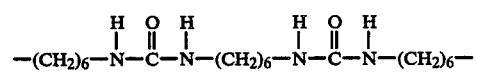   (10)

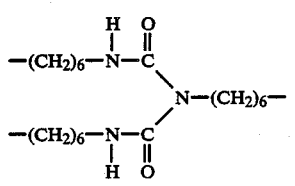   (11)

B' denotes H or likewise denotes a radical of the formula 2,

X denotes O or $NR_4$, in which $R_4=H$ or $C_{1-4}$-alkyl and $R_1$-X denotes a radical corresponding to one of the following formulae 12 to 15

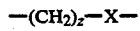   (12)

   (13)

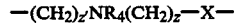   (14)

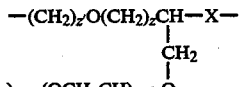   (15)

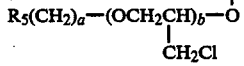

in which z and z', which can be identical or different, are each an integer from 1 to 10, preferably 1 to 5, $R_5$ has one of the meanings of $R_2$ or of $R_f$ and X, $R_4$, a and b have the meanings given; of the meanings of $R_1$-X, those according to the formulae 12, 14 and 15 are preferred.

The perfluoroalkyl radical $R_f$ and the alkyl radical $R_2$ can be straight-chain or branched, and are preferably straight-chain. $R_f$ as a rule represents a mixture of perfluoroalkyl radicals with the abovementioned number of carbon atoms. A preferably denotes a radical of the formulae 4, 8 or 9 to 11 (that is to say toluylene diisocyanate, hexamethylene diisocyanate and isocyanates corresponding to the formulae 9 to 11).

The urethanes according to the invention, containing fluorine and polysiloxane, are prepared by reacting a fluoroalcohol-isocyanate adduct of the following formula 16

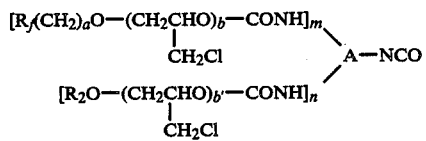
(16)

in which $R_f$, $R_2$, a, b, b', m, n and A have the abovementioned meanings, with a polysiloxane of the following formula 17

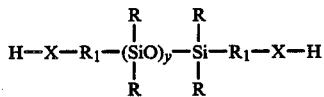
(17)

in which R, X, $R_1$-X and y have the abovementioned meanings, in a molar ratio of 1 to 2:1 at a temperature of 30° to 130° C., preferably 50° to 110° C.

The polysiloxanes to be used as starting compounds are known and are commercially available. They are colorless liquids which are more or less viscous at room temperature. Preferred polysiloxanes are those resulting from formula 17, where r, X, $R_1$-X and y have the preferred meanings given.

The fluoroalcohol-isocyanate adducts to be used as starting compounds are described in more detail below. Those adducts resulting from formula 16 where n=0 are known from the two abovementioned German Offenlegungsschriften Nos. 3,530,967 and 3,540,147. They are obtained by reacting an alcohol of the formula $R_f(CH_2)_a$-OH, in which $R_f$ and a have the meanings given, with epichlorohydrin at a temperature of 30° to 100° C., preferably 40° to 70° C., and by reacting the alcohol-epichlorohydrin adduct thus obtained with an isocyanate corresponding to one of the formulae 3 to 11 at a temperature of 70° to 150° C., preferably 80° to 130° C. In the reaction of the alcohol with epichlorohydrin, the two reaction components are clearly used in a molar ratio of 1 to b (b has the meaning given in formula 16); likewise, in the reaction of the alcohol-epichlorohydrin adduct with isocyanate, the two reaction components are clearly used in the molar ratio resulting from the required meaning for m in formula 16. As described in detail in the two German Offenlegungsschriften mentioned, both reactions can be carried out in the presence of a Lewis acid, using an organic solvent. The two reactions proceed quantitatively. The resulting fluoroalcohol-isocyanate adducts are yellow-colored products which are more or less waxy at room temperature.

The fluoroalcohol-isocyanate adducts in question containing no epichlorohydrin, i.e. adducts according to formula 16 where n=0 and b=0, are clearly obtained by reacting an alcohol of the formula $R_f(CH_2)_a$-OH, in which $R_f$ and a have the meanings given, directly with an isocyanate corresponding to one of the formulae 3 to 11; this reaction is carried out under the same conditions of the reaction with isocyanate described above. These fluoroalcohol-isocyanate adducts are also yellow-colored products which are more or less waxy at room temperature. Those adducts resulting from formula 16 where n is not 0 are obtained by reacting an alcohol of the formula

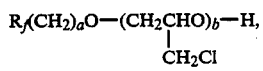

in which $R_f$, a and b have the meanings given, and an alcohol of the formula

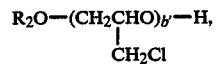

in which $R_2$ and b' have the meanings given, with an isocyanate corresponding to one of the formulae 3 to 11. This reaction is likewise carried out under the conditions of the reaction with isocyanate described above, i.e. at a temperaturee of 70° to to 150° C., preferably 80° to 130° C. The reaction components are here also clearly used in the molar ratio resulting from the required meanings of m and n in formula 16. This reaction, which proceeds quantitatively, can also be carried out in the presence of a Lewis acid, using an organic solvent. The resulting fluoroalcohol-isocyanate adducts are likewise yellow-colored products which are more or less waxy at room temperature. Suitable Lewis acids as a catalyst for the reactions in question are $BF_3$, boron trifluoride-diethyl etherate, $SnCl_4$, $SbCl_5$, $TiCl_4$, $FeCl_3$, $PF_5$ and/or dibutyltin dilaurate, boron trifluoride-diethyl etherate and dibutyltin dilaurate being preferred. Suitable solvents for the reactions in question are halogenated hydrocarbons, such as carbon tetrachloride (boiling point 77° C.), dichloroethane (boiling point 84° C.) and trifluorotrichloroethane (boiling point 48° C.), ketones, such as acetone (56° C.), methyl ethyl ketone (80° C.) and diethyl ketone (101° C.), ethers, such as diisopropyl ether (68° C.), tetrahydrofuran (66° C.) and dibutyl ether (142° C.), and esters, such as ethyl acetate (77° C.) and butyl acetate (123° C.).

To prepare the urethanes according to the invention, 1 to 2 mole (depending on the required urethane compound) of fluoroalcohol-isocyanate adduct and about 1 mole of polysiloxane are reacted at a temperature of 30° to 130° C., preferably 50° to 110° C. The reaction proceeds quantitatively. It is preferably carried out using an organic solvent. The abovementioned solvents are also suitable here. The amount of solvent is also chosen here so that a mixture which is easily stirrable is obtained. The reaction time is in general about 5 to 15 hours. When the reaction has ended and the solvent used has been distilled off, the required urethane compound according to the invention is present. It is preferably to carry out the reaction in the form of a main reaction and an after-reaction. In the main reaction, the two reaction components, the fluoroalcohol-isocyanate adduct and the polysiloxane, are reacted virtually completely, using a solvent at a temperature of preferably 50° to 80° C., after which the solvent is distilled off. In the after-reaction, the reaction product which has been freed from the solvent is kept at a temperature of preferably 90° to 110° C. until the reaction has ended completely and the required urethane compound according to the invention is thus present.

According to the invention, the novel urethanes containing fluorine and polysiloxane are used for the treatment of textiles. They impart to the textiles an outstanding hydrophobicity and oleophobicity and moreover also the other particularly desirable property of soft handle. The textile material can be of natural or synthetic nature. It preferably consists of cotton, polyamide, polyester and/or polyacrylonitrile. The textile material can be in any desired form, thus, for example, as thread, fibers, yarn, flock, woven, fabric, carpet or nonwoven fabric. The amount of compound according to the invention applied is chosen so that 0.05 to 1.5% by weight of fluorine, preferably 0.1 to 0.8% by weight of fluorine, is present on the textile material, the percentages by weight relating to the treated textile material. The urethanes according to the invention are as a rule applied to the textile material during one of the customary textile treatments with finishes, the urethane according to the invention being incorporated into the finish, or with the aid of solutions, emulsions or dispersions which have been prepared specifically from the urethanes. In the textile treatment preparations, for example spinning preparations, the urethanes according to the invention are present in a concentration of 0.5 to 5% by weight, preferably 1 to 3% by weight. In the solution, emulsions or dispersions, they are present in a concentration of 5 to 40% by weight, preferably 8 to 30% by weight. The treatment of the textiles with the solutions, emulsions or dispersions is carried out by customary methods, thus, for example, by spraying, dipping, padding and the like. The impregnated textile material is then dried and subjected to heat treatment. The heat treatment (also called condensation) is as a rule carried out by heating the textile material to a temperature of 130° to 200° C. and keeping it at this temperature for 10 seconds to 10 minutes. The textile material treated with the urethanes according to the invention has the abovementioned outstanding properties.

The invention is now illustrated in more detail by examples.

Compounds according to the invention

EXAMPLE 1

80 g (0.16 mole) of a commercially available perfluoroalkylethanol mixture with perfluoroalkyl=$C_8F_{17}$-$C_{16}F_{33}$ (OH number=106), 80 g of 1,2,2-trifluorotrichloroethane ($CFCl_2$-$CF_2Cl$) as the solvent and 0.5 g of boron trifluoride-deithyl etherate as the catalyst (i.e. 0.6% by weight of catalyst, based on perfluoroalkylethanol) are taken in a glass flask equipped with a stirrer, reflux condenser, thermometer, dropping funnel and heating bath. 29 g (0.32 mole) of epichlorohydrin were added dropwise to this solution at 45° C., with stirring, after which the mixture was kept at reflux temperature (i.e. 50°-55° C.) for 3 hours. The solvent was then distilled off in vacuo (waterpump vacuum). The fluoroalcohol thus obtained, a waxy, yellow-colored product, corresponds to the following formula:

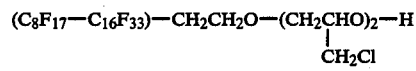

(the value of 2 for the epichlorohydrin units is a mean value of 1 to 8 epichlorohydrin units added on).

In all the further examples in which the alcohol containing epichlorohydrin has been used for further reaction with icocyanate, this has been prepared in an analogous manner.

The reaction of the fluoroalcohol with isocyanate to give the fluoroalcohol-isocyanate adduct and the reaction of this adduct with polysiloxane were carried out in a glass flask equipped with a stirrer, reflux condenser, thermometer and heating bath. 67.9 g (0.1 mole) of fluoroalcohol and 17.4 g (0.1 mole) of toluylene diisocyanate corresponding to formula 4 (a mixture, obtainable as a commercial product, of about 80% by weight of 2,4- and about 20% by weight of 2,6-toluylene diisocyanate) were taken and were kept at 110° C. for 4 hours, with stirring. 4 drops of dibutyltin dilaurate were now added to the mixture, after which the mixture was kept at 110° C. for 3 hours, with stirring, for the after-reaction. The resulting fluoroalcohol-isocyanate adduct was a waxy, yellow-colored product. For reaction of the adduct with a polysiloxane, acetone (about 50 to 150 ml) was added as a solvent to the adduct in the glass flask, after cooling. 57.7 g (0.05 mole) of the polysiloxane of the formula

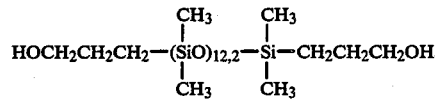

dissolved in acetone (about 50 to 150 ml), were added to the solution. The mixture was kept at reflux temperature (i.e. 60° to 70° C.) for 2 hours, with stirring, and the alcohol-isocyanate adduct was thereby reacted with the polysiloxane. After the reaction time of 2 hours, the acetone solvent was distilled off and the contents of the glass flask were kept at 110° C. for 5 hours, with stirring, for the after-reaction. The urethane compound according to the invention thus obtained (yield 98.6% of theory) was a waxy, brown-colored product. The empirical composition of the urethane according to the invention corresponds to formula number 1 given in the table after the examples.

EXAMPLE 2

Batch:
135.8 g (0.2 mole) of fluoroalcohol as in Example 1
57.0 g (0.1 mole) of triisocyanate corresponding to formula 11 (a mixture, obtainable as a commercial product, of the three isocyanates corresponding to the formulae 9, 10 and 11 with the triisocyanate as the main constituent)
57.7 g (0.05 mole) of polysiloxane as in Example 1
Procedure: as in Example 1

The resulting urethane compound according to the invention (yield 97.0% of theory) was a waxy, brown-colored product. The empirical composition of the urethane according to the invention corresponds to formula number 2 given in the table after the examples.

EXAMPLE 3

Batch:
69.7 g (0.1 mole) of fluoroalcohol as in Example 1
28.5 g (0.05 mole) of triisocyanate as in Example 2
96.1 g (0.025 mole) of polysiloxane of the formula

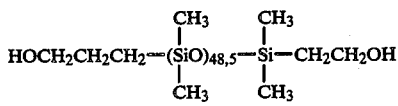

Procedure: as in Example 1

The resulting urethane compound according to the invention (yield 96.4% of theory) was a waxy, brown-colored product. Compare formula number 3.

EXAMPLE 4

Batch:
67.9 g (0.1 mole) of fluoroalcohol as in Example 1
16.8 g (0.1 mole) of diisocyanate corresponding to formula 8, i.e. hexamethylene diisocyanate
57.7 g (0.05 mole) of polysiloxane as in Example 1
Procedure: as in Example 1

The resulting urethane compound according to the invention (yield 98.7% of theory) was a waxy, brown-colored product. Compare formula number 4.

EXAMPLE 5

Batch:
107.8 g (0.2 mole) of fluoroalcohol of the formula $(C_8F_{17}\text{-}C_{16}F_{33})\text{-}CH_2CH_2OH$
57.0 g (0.1 mole) of triisocyanate as in Example 2
57.7 (0.05 mole) of polysiloxane as in Example 1
Procedure: as in Example 1

The resulting urethane compound according to the invention (yield 96.4% of theory) was a waxy, brown-colored product. Compare formula 5.

EXAMPLE 6

Batch:
22.2 g (0.032 mole) of fluoroalcohol as in Example 1
9.1 g (0.016 mole) of triisocyanate as in Example 2
52.1 g (0.008 mole) of polysiloxane of the formula Procedure: The fluoroalcohol-isocyanate adduct was prepared as in Example 1. For reaction of the adduct with the polysiloxane, 52.1 g (0.008 mole) of the given polysiloxane, dissolved in 300 ml of 1,2,2-trifluorotrichloroethane, were added to the adduct (in the glass flask). The mixture was kept at reflux temperature (i.e. 50° to 60° C.) for 5 hours, with stirring, and the alcohol-isocyanate adduct was thereby reacted with the polysiloxane. After the reaction time of 5 hours, the solvent was distilled off and the contents of the glass flask were kept at 110° C. for 6 hours, with stirring, for the after-reaction. The resulting urethane compound according to the invention (yield 99.7% of theory) was a waxy, slightly yellow-colored product. Compare formula number 6.

The polysiloxane to be used in this example can be obtained, for example, by reacting one mole of the polysiloxane of the following formula

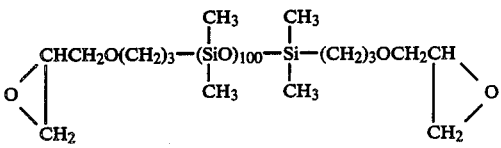

with 2 moles of fluoroalcohol of the following formula

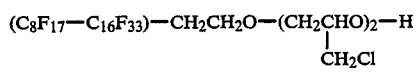

To accelerate the reaction, it is carried out in the presence of a Lewis acid as a catalyst, using a solvent such as 1,2,2-trifluorotrichloroethane. When the reaction has ended, the required polysiloxane to be used in Example 6 is present.

EXAMPLE 7

Batch:
54.0 (0.08 mole) of fluoroalcohol as in Example 1
22.8 g (0.04 mole) of triisocyanate as in Example 2
110.0 g (0.02 mole) of polysiloxane of the formula

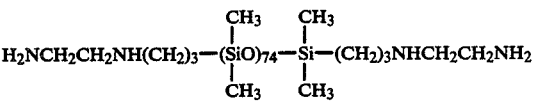

Procedure: as in Example 6, but methyl ethyl ketone (boiling point 80° C.) was used as the solvent instead of 1,2,2-trifluorotrichloroethane.

The resulting urethane compound according to the invention (yield 98.1% of theory) was a waxy, yellow-colored product. Compare formula number 7.

EXAMPLE 8

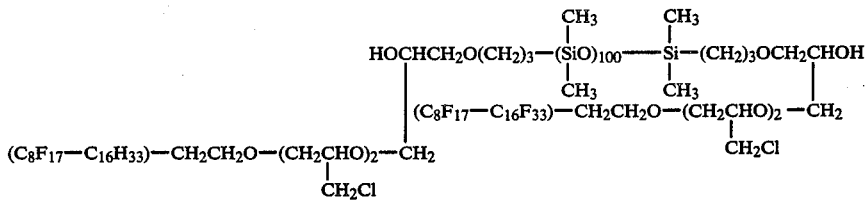

Batch:
20.4 g (0.04 mole) of fluoroalcohol as in Example 5
11.6 g (0.02 mole) of triisocyanate as in Example 2
55.0 g (0.01 mole) of polysiloxane as in Example 7
Procedure: as in Example 7

The resulting urethane compound according to the invention (yield 99.7% of theory) was a product as in Example 7. Compare formula number 8.

EXAMPLE 9

Batch:
20.4 g (0.04 mole) of fluoroalcohol as in Example 5
11.6 g (0.02 mole) of triisocyanate as in Example 2

55.0 g (0.01 mole) of polysiloxane of the formula

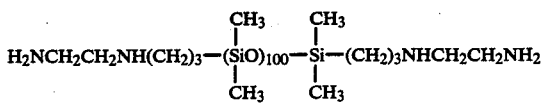

Procedure: as in Example 7
The resulting urethane compound according to the invention (yield 98.9% of theory) was a product as in Example 7. Compare formula number 9.

EXAMPLE 10

Batch:
66.4 g (0.13 mole) of fluoroalcohol as in Example 5
38.0 g (0.064 mole) of triisocyanate as in Exmple 2
290.0 g (0.032 mole) of polysiloxane of the formula

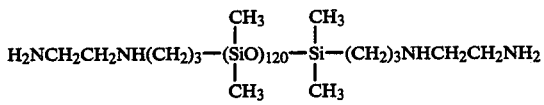

Procedure: as in Example 7
The resulting urethane compound according to the invention (yield 98.6% of theory) was a product as in Example 7. Compare formula number 10.

EXAMPLE 11

Batch:
40.3 g (0.076 mole) of fluoroalcohol as in Example 5
23.1 g (0.038 mole) of triisocyanate as in Example 2
300.0 g (0.019 mole) of polysiloxane of the formula

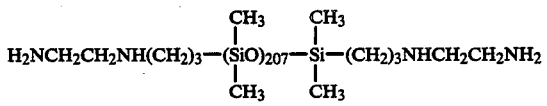

Procedure: as in Example 7
The resulting urethane compound according to the invention (yield 99.0% of theory) was a product as in Example 7. Compare formula number 11.

EXAMPLE 12

Batch:
102.0 g (0.2 mole) of fluoroalcohol as in Example 5
54.1 g (0.2 mole) of stearyl alcohol: $C_{18}H_{37}OH$
115.6 g (0.2 mole) of triisocyanate as in Example 2
115.3 g (0.1 mole) of polysiloxane as in Example 1

Procedure: The abovementioned fluoroalcohol, the stearyl alcohol, the triisocyanate and 250 ml of methyl ethyl ketone as the solvent were taken in the glass flask described in Example 1 for reaction of the fluoroalcohol with the isocyanate. The mixture was kept at reflux temperature (i.e. 80° to 90° C.) for 5 hours, with stirring. 4 drops of dibutyltin dilaurate were now added to the mixture, after which the mixture was again kept at reflux temperature and stirred for 3 hours, for the after-reaction. The resulting fluoroalcohol-isocyanate adduct (with the fluoroalcohol and the stearyl alcohol on separate isocyanate groups) was a waxy, yellow-colored product. The reaction of the adduct with the polysiloxane was carried out as in Example 6, but using methyl ethyl ketone as the solvent (compare Example 7). The resulting urethane compound according to the invention (yield 98.0% of theory) was a waxy, brown-colored product. Compare formula number 12.

EXAMPLE 13

Batch:
102.0 g (0.2 mole) of fluoroalcohol as in Example 5
57.8 g (0.1 mole) of triisocyanate as in Example 2
115.3 g (0.1 mole) of polysiloxane as in Example 1

Procedure: as in example 1, with the difference that methyl ethyl ketone was used as the solvent instead of acetone.
The resulting urethane compound according to the invention (Yield 97.5% of theory) was a product as in Example 5. Compare formula number 13.

TABLE

No. Chemical formulae of the compounds according to the invention of Examples 1 to 13

1

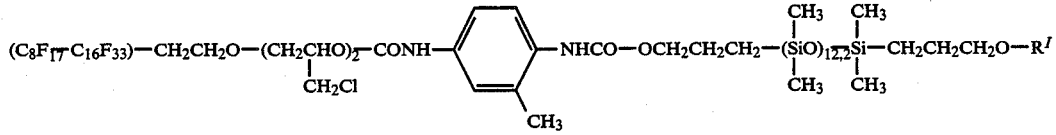

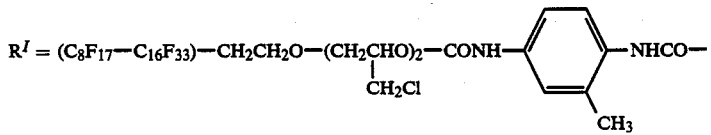

2

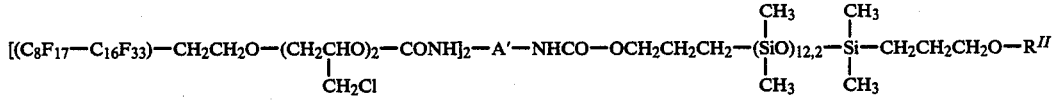

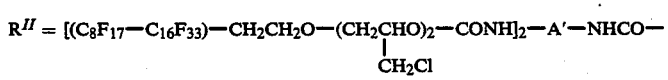

TABLE-continued

| No. | Chemical formulae of the compounds according to the invention of Examples 1 to 13 |
|---|---|

$$A' = \begin{matrix} -(CH_2)_6NHCO \\ \phantom{xxx}\diagdown \\ \phantom{xxxxx}N-(CH_2)_6- \\ \phantom{xxx}\diagup \\ -(CH_2)_6NHCO \end{matrix}$$

3  $[(C_8F_{17}-C_{16}F_{33})-CH_2CH_2O-(CH_2CHO)_2-CONH]_2-A'-NHCO-OCH_2CH_2CH_2-(SiO)_{48.5}-Si-CH_2CH_2CH_2O-R^{II}$
   $\phantom{xxxxxxxxxxxxxxxxxxxxxxxxxxxx}|\phantom{xxxxxxxxxxxxxxxxxxxxxxxxxxxxxxxxxxxxxxxxx}|\phantom{xxxxx}|$
   $\phantom{xxxxxxxxxxxxxxxxxxxxxxxxxxxx}CH_2Cl\phantom{xxxxxxxxxxxxxxxxxxxxxxxxxxxxxxxxxxxxxx}CH_3\phantom{xxx}CH_3$
   (with CH_3 groups above Si atoms)

4  $(C_8F_{17}-C_{16}F_{33})-CH_2CH_2O-(CH_2CHO)_2-CONH-(CH_2)_6-NHCO-OCH_2CH_2CH_2-(SiO)_{12.2}-Si-CH_2CH_2CH_2O-R^{III}$
   $\phantom{xxxxxxxxxxxxxxxxxxxxxxxx}|$
   $\phantom{xxxxxxxxxxxxxxxxxxxxxxxx}CH_2Cl$ $R^{III} = (C_8F_{17}-C_{16}F_{33})-CH_2CH_2O-(CH_2CHO)_2-CONH-(CH_2)_6-NHCO-$
$\phantom{xxxxxxxxxxxxxxxxxxxxxxxxxxxxxxxxxxxxx}|$
$\phantom{xxxxxxxxxxxxxxxxxxxxxxxxxxxxxxxxxxxxx}CH_2Cl$ 5  $[(C_8F_{17}-C_{16}F_{33})-CH_2CH_2O-CONH]_2-A'-NHCO-OCH_2CH_2CH_2-(SiO)_{12.2}-Si-CH_2CH_2CH_2O-R^{IV}$ $R^{IV} = [(C_8F_{17}-C_{16}F_{33})-CH_2CH_2O-CONH]_2-A'-NHCO-$ 6  $[(C_8F_{17}-C_{16}F_{33})-CH_2CH_2O-(CH_2CHO)_2-CONH]_2-A'-NHCO-OCHCH_2O(CH_2)_3-(SiO)_{100}Si-(CH_2)_3OCH_2CHO-R^{II}$
   $\phantom{xxxxxxxxxxxxxxxxxxxxxxxxxxxx}|\phantom{xxxxxxxxxxxxxxxxxxxxxxxxxxxxxxxxx}|$
   $\phantom{xxxxxxxxxxxxxxxxxxxxxxxxxxxx}CH_2Cl$
   $\phantom{xxxxxxxxxxxxxxxxx}(C_8F_{17}-C_{16}F_{33})-CH_2CH_2O-(CH_2CHO)_2-CH_2\phantom{xxxx}(C_8F_{17}-C_{16}F_{33})-CH_2CH_2O-(CH_2CHO)_2-CH_2$
   $\phantom{xxxxxxxxxxxxxxxxxxxxxxxxxxxxxxxxxxxxxxxxx}|\phantom{xxxxxxxxxxxxxxxxxxxxxxxxxxxxxxxxxxxxxxxxxxxxxxxxxxxxx}|$
   $\phantom{xxxxxxxxxxxxxxxxxxxxxxxxxxxxxxxxxxxxxxxxx}CH_2Cl\phantom{xxxxxxxxxxxxxxxxxxxxxxxxxxxxxxxxxxxxxxxxxxxxxxxx}CH_2Cl$ 7  $[(C_8F_{17}-C_{16}F_{33})-CH_2CH_2O-(CH_2CHO)_2-CONH]_2-A'-NHCO-NHCH_2CH_2NH(CH_2)_3-(SiO)_{74}-Si-(CH_2)_3NHCH_2CH_2NH-R^{II}$
   $\phantom{xxxxxxxxxxxxxxxxxxxxxxxxxxxx}|$
   $\phantom{xxxxxxxxxxxxxxxxxxxxxxxxxxxx}CH_2Cl$ 8  $[(C_8F_{17}-C_{16}F_{33})-CH_2CH_2O-CONH]_2-A'-NHCO-NHCH_2CH_2NH(CH_2)_3-(SiO)_{74}-Si-(CH_2)_3NHCH_2CH_2NH-R^{IV}$ 9  $[(C_8F_{17}-C_{16}F_{33})-CH_2CH_2O-CONH]_2-A'-NHCO-NHCH_2CH_2NH(CH_2)_3-(SiO)_{100}-Si-(CH_2)_3NHCH_2CH_2NH-R^{IV}$ 10  $[(C_8F_{17}-C_{16}F_{33})-CH_2CH_2O-CONH]_2-A'-NHCO-NHCH_2CH_2NH(CH_2)_3-(SiO)_{120}-Si-(CH_2)_3NHCH_2CH_2NH-R^{IV}$ 11  $[(C_8F_{17}-C_{16}F_{33})-CH_2CH_2O-CONH]_2-A'-NHCO-NHCH_2CH_2NH(CH_2)_3-(SiO)_{207}-Si-(CH_2)_3NHCH_2CH_2NH-R^{IV}$ 12  $(C_8F_{17}-C_{16}F_{33})-CH_2CH_2O-CONH$
    $\phantom{xxxxxxxxxxxxxxxxxxxxx}\diagdown$
    $\phantom{xxxxxxxxxxxxxxxxxxxxxxx}A'-NHCO-OCH_2CH_2CH_2-(SiO)_{13}-Si-CH_2CH_2CH_2O-R^V$
    $\phantom{xxxxxxxxxxxxxxxxxxxxx}\diagup$
    $C_{18}H_{37}O-CONH$ $R^V = (C_8F_{17}-C_{16}F_{33})-CH_2CH_2O-CONH$
$\phantom{xxxxxxxxxxxxxxxxxxxxxxxxxxx}\diagdown$
$\phantom{xxxxxxxxxxxxxxxxxxxxxxxxxxxxx}A'-NHCO-$
$\phantom{xxxxxxxxxxxxxxxxxxxxxxxxxxx}\diagup$
$\phantom{xxxxxxx}C_{18}H_{37}O-CONH$

| No. | Chemical formulae of the compounds according to the invention of Examples 1 to 13 |
|---|---|
| 13 | $[(C_8F_{17}-C_{16}F_{33})-CH_2CH_2O-CONH]_2-A'-NHCO-OCH_2CH_2CH_2-(SiO)_{12.2}-Si-CH_2CH_2CH_2OH$ with $CH_3$ groups on Si |

TABLE-continued

Use of the compounds according to the invention

EXAMPLES I TO XIII

In these examples, the urethanes 1 to 13 according to the invention were tested with the aid of a solution prepared from the urethanes. The solutions consisted of 1 to 3 g of urethane and 100 g of methyl ethyl ketone. In each case an identical woven fabric of polyamide and in each case an identical woven fabric of cotton was treated with each of the 13 solutions (liquors) by a procedure in which the woven fabric was dipped into the liquor in the customary manner, a liquor pick-up of 30 to 40% by weight was established with a padder and the ketone-moist woven fabric was initially air-dried and then kept at a temperature of 150° C. for 30 seconds (condensation). After this treatment, there were 26 woven fabrics (13 polyamide woven fabrics and 13 cotton woven fabrics) with the urethanes 1 to 13 according to the invention, a fluorine content of 0.2% by weight being present on each woven fabric, the percentages by weight being based on the weight of the woven fabric. The 26 woven fabrics were tested for their oil-repellency in accordance with AATCC test 118-1966, water-repellency in accordance with AATCC test 22-1952 and soft handle properties by manual testing.

In AATTCC test 118-1966 (American Association of Textile Chemists and Colorists), as is known 3 drops of a certain test liquid (see below) are carefully placed on the textile material to be tested. The action time is 30 seconds. The value at which no aparent wetting of the woven fabric under the drops has still been caused (at the end of the action time) is stated:

| Test liquid | Oil repellency value |
|---|---|
| paraffin oil | 1 |
| paraffin oil:n-hexadecane = 65:35 | 2 |
| n-hexadecane | 3 |
| n-tetradecane | 4 |
| n-dodecane | 5 |
| n-decane | 6 |
| n-octane | 7 |
| n-heptane | 8 |

An oil repellency value of 1 denotes the worst and an oil repellency value of 8 the best repellency effect.

In AATCC test 22-1952, as is known the textiles to be tested are sprinkled under standardized conditions. The water shedding effect is evaluated visually with ratings of 0 to 100, the rating of 0 denoting the worst and the rating of 100 the best shedding effect. The soft handle properties were evaluated by manual testing, ratings of 0 to 3 being stated; rating 0 means that there is no noticeable softness, rating 1 means that the woven fabric is clearly softer than an untreated woven fabric, rating 2 indicates even higher soft handle properties and rating 3 means that the softness is particularly high (as soft as wool).

The results of the tests are summarized below.

| Example and urethane compound tested | Oil repellency (1) | Oil repellency (2) | Water repellency (1) | Water repellency (2) | Soft handle properties (1) | Soft handle properties (2) |
|---|---|---|---|---|---|---|
| I/1 | 4 | 4 | 80 | 70 | 1 | 1 |
| II/2 | 6 | 6 | 90 | 80 | 1 | 1 |
| III/3 | 5 | 5 | 90 | 80 | 2 | 2 |
| IV/4 | 4 | 4 | 80 | 80 | 1 | 1 |
| V/5 | 6 | 5 | 100 | 100 | 1 | 1 |
| VI/6 | 6 | 6 | 90 | 80 | 2 | 2 |
| VII/7 | 5 | 5 | 90 | 90 | 2 | 2 |
| VIII/8 | 6 | 5 | 100 | 100 | 3 | 3 |
| IX/9 | 7 | 6 | 100 | 100 | 2 | 2 |
| X/10 | 6 | 6 | 100 | 90 | 3 | 3 |
| XI/11 | 6 | 5 | 90 | 80 | 3 | 3 |
| XII/12 | 7 | 6 | 80 | 80 | 1 | 1 |
| XIII/13 | 7 | 6 | 80 | 80 | 1 | 1 |

(1) = polyamide woven fabric
(2) = cotton woven fabric

The test results show that a good oleophobicity and hydrophbicity and good soft handle properties are achieved with the urethanes according to the invention. Because of the specific soft handle, the textiles finished with the urethanes according to the invention also have good elasticity properties.

The urethanes according to the invention containing fluorine and polysiloxane are also suitable for the treatment and finishing of leather, skins and wood, in particular for leather treatment. This use according to the invention of the novel urethanes is described in more detail below with the air of leather. Examples of leather which may be mentioned are cattle, goat, sheep and pig leather. The amount of urethane according to the invention (active compound) applied is chosen so that there are 0.05 to 2 g of active compound per square meter of leather, preferably 0.1 to 1.5 g of active compound per square meter of leather. The customary procedures for oleophobic and hydrophobic treatment of leather can be used for the application. The spraying technique is preferably used, the active compound being sprayed in the form of a solution onto the leather to be treated. Suitable solvents are alkanols, such as isopropanol, acetone, acetic acid esters, such as butyl acetate, or mixtures of, for example, alkanols and heptane. The concentration of active compound in the solution prepared for the treatment is in general 0.1 to 2% by weight, preferably 0.3 to 1% by weight, the percentages by weight being based on the weight of the solution. The solution containing the active compound is as a rule sprayed onto the leather with the aid of a propellant gas, for example propane, butane, fluorohydrocarbons and the like, or with the aid of special spraying devices wiithout propellant gas, the abovementioned amount of active compound being applied. After drying, the leather treated according to the invention is present.

We claim:

1. A urethane containing fluorine and polysiloxane, of the following formula 1

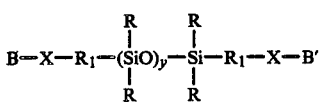  (1)

in which
R denotes $CH_3$ or $C_2H_5$,
y denotes a number from 5 to 500,
B denotes a radical of the following formula 2

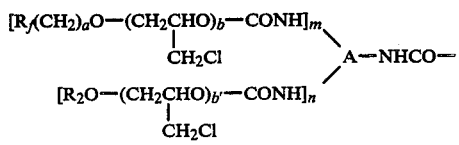  (2)

in which
$R_f$ denotes a perfluoroalkyl radical with 4 to 20 carbon atoms, an $\omega$-H-perfluoroalkyl radical with 4 to 20 carbon atoms, or a radical of the formula $R_f'SO_2NR_3$ or of the formula $R_f'CH_2CH_2SO_2NR_3$, in which $R_f'$ is a perfluoroalkyl radical with 4 to 20 carbon atoms and $R_3$=H or $C_{1-4}$-alkyl,
$R_2$ denotes an alkyl radical with 4 to 20 carbon atoms,
a denotes an integer from 1 to 4,
b denotes a number from 0 to 10,
b' denotes a number from 0 to 10,
m denotes a number from 1 to 2 and
n denotes a number from 0 to 1, the sum of m+n being not more than 2, and
A denotes a radical corresponding to one of the following formulae (3) to (11)

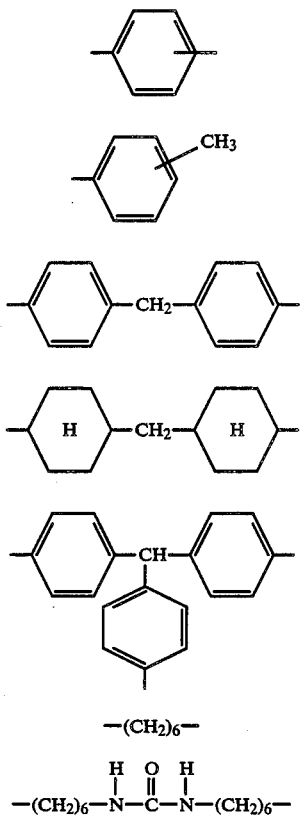

-continued

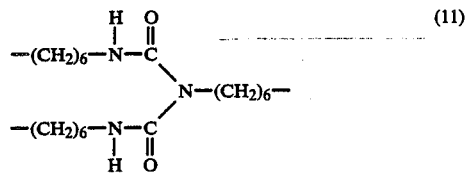  (10)

or

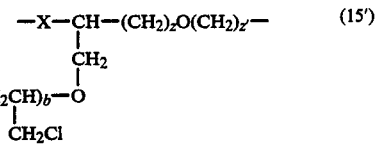  (11)

B' denotes H or likewise denotes a radical of the formula 2,
X denotes O or $NR_4$, in which $R_4$=H or $C_{1-4}$-alkyl
-X-$R_1$-denotes a radical corresponding to one of the following formulae (12') to (15')

$-X-(CH_2)_z-$  (12')

$-X-(CH_2)_zO-(CH_2)_{z'}-$  (13')

$-X-(CH_2)_zNR_4(CH_2)_{z'}-$  (14')

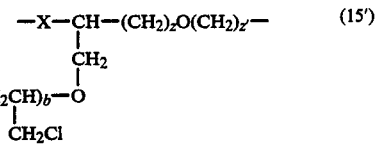  (15')

in which z and z' are each an integer from 1 to 10, $R_5$ has one of the meanings of $R_2$ or of $R_f$, and X, $R_4$, a, and b have the meanings defined previously, and
$R_1$-X denotes a radical corresponding to one of the following formulae 12 to 15

$-(CH_2)_z-X-$  (12)

$-(CH_2)_{z'}O(CH_2)_z-X-$  (13)

$-(CH_2)_{z'}NR_4(CH_2)_z-X-$  (14)

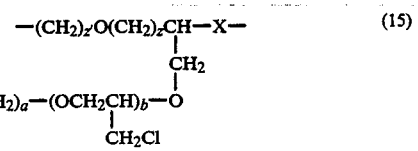  (15)

in which z, z', $R_5$, X, $R_4$, a, and b have the meanings defined previously.

2. A urethane containing fluorine and polysiloxane as claimed in claim 1, in which
R denotes $CH_3$ or $C_2H_5$,
y denotes a number from 10 to 300,
B denotes a radical of the formula (2), in which
  $R_f$ denotes a perfluoroalkyl radical with 6 to 16 carbon atoms,
  $R_2$ denotes an alkyl radical with 10 to 18 carbon atoms,
  a denotes 2,
  b denotes 0 or 1 to 5,
  b' denotes 0 or 1 to 5,
  m denotes 1 to 2 and
  n denotes 0,
  A denotes a radical corresponding to one of the formulae (4), (8), (9), (10), or (11), B' denotes H or a radical of the formula (2) with the meanings given for formula (2), X denotes O or $NR_4$, in which $R_4$=H or is $C_{1-4}$-alkyl and —$R_1$—X denotes a radical corresponding to one of the formulae (12), (14) and (15), and —X—$R_1$— denotes a radical corresponding to one of the formulae (12′), (14′), and (15′), in which z and z′ are each an integer from 1 to 5, $R_5$ has the meaning given for $R_2$ or for $R_f$ and X, $R_4$, a and b have the meanings given.

3. A process for the preparation of a urethane containing fluorine and polysiloxane as claimed in claim 1, which comprises reacting a fluoroalcohol-isocyanate adduct of the following formula (16)

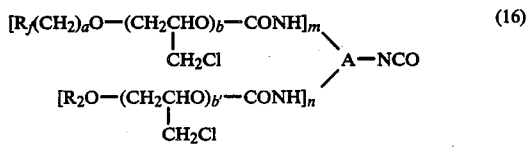

in which $R_f$, $R_2$, a, b, b′, m, n and A are as defined in claim 1, with a polysiloxane of the following formula (17)

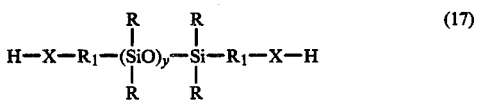

in which R, X, —X—$R_1$—, —$R_1$—X— and y are as defined in claim 5, in a molar ratio of 1 to 2:1 at a temperature of 30° to 130° C.

* * * * *